United States Patent
Chao et al.

(10) Patent No.: US 12,050,545 B2
(45) Date of Patent: Jul. 30, 2024

(54) METHOD AND DEVICE FOR CONSTRUCTING COMMUNICATION TOPOLOGY STRUCTURE ON BASIS OF MULTIPLE PROCESSING NODES

(71) Applicant: CAMBRICON (XI'AN) SEMICONDUCTOR CO., LTD., Shaanxi (CN)

(72) Inventors: Lu Chao, Shaanxi (CN); Fan Liang, Shaanxi (CN); Qinglong Chai, Shaanxi (CN); Xiao Zhang, Shaanxi (CN); Yanqiang Gao, Shaanxi (CN); Yongzhe Sun, Shaanxi (CN); Zhiyong Li, Shaanxi (CN); Chen Zhang, Shaanxi (CN); Tian Meng, Shaanxi (CN)

(73) Assignee: CAMBRICON (XI'AN) SEMICONDUCTOR CO., LTD., Shaanxi (CN)

( * ) Notice: Subject to any disclaimer, the term of this patent is extended or adjusted under 35 U.S.C. 154(b) by 0 days.

(21) Appl. No.: 17/920,961

(22) PCT Filed: Mar. 15, 2021

(86) PCT No.: PCT/CN2021/080889
§ 371 (c)(1),
(2) Date: Oct. 24, 2022

(87) PCT Pub. No.: WO2021/213076
PCT Pub. Date: Oct. 28, 2021

(65) Prior Publication Data
US 2023/0169031 A1   Jun. 1, 2023

(30) Foreign Application Priority Data
Apr. 24, 2020   (CN) .................. 202010334771.X (51) Int. Cl.
*G06F 15/177*   (2006.01)
*G06F 15/173*   (2006.01)

(52) U.S. Cl.
CPC .. *G06F 15/17306* (2013.01); *G06F 15/17375* (2013.01); *G06F 15/177* (2013.01)

(58) Field of Classification Search
CPC ......... G06F 15/17306; G06F 15/17375; G06F 15/177
See application file for complete search history.

(56) References Cited

U.S. PATENT DOCUMENTS

9,250,973 B2    2/2016   Brehmer et al.
11,341,009 B1*  5/2022   Wu ....................... G06F 16/182
(Continued)

FOREIGN PATENT DOCUMENTS

CN    102395954 A    3/2012
CN    104572182 A    4/2015
(Continued)

OTHER PUBLICATIONS

Lenovo ("What is Ring Topology & its Advantages", http://www.lenovo.com/us/en/glossary/what-is-ring-topology, 4 pages) (Year: 2024).*

(Continued)

*Primary Examiner* — Joseph R Maniwang
(74) *Attorney, Agent, or Firm* — The PL Law Group, PLLC (57) ABSTRACT

A communication configuration apparatus for constructing a communication topology structure based on a plurality of processing nodes may be included in a combined processing apparatus. The combined processing apparatus further includes an interconnection interface and other processing apparatus. The communication configuration apparatus interacts with other processing apparatus to jointly complete a computing operation specified by a user. The combined processing apparatus further includes a storage apparatus. The storage apparatus is connected to the communication configuration apparatus and other processing apparatuses, respectively. The storage apparatus is used for storing data of the communication configuration apparatus and other processing apparatus. A technical solution of the present (Continued)

disclosure may improve efficiency of inter-chip communication.

11 Claims, 8 Drawing Sheets

(56) References Cited

U.S. PATENT DOCUMENTS

| | | | |
|---|---|---|---|
| 2005/0237948 A1* | 10/2005 | Wan | H04L 41/12 370/254 |
| 2017/0302524 A1 | 10/2017 | Mihai et al. | |
| 2019/0213217 A1 | 7/2019 | Zhang et al. | |
| 2020/0104399 A1 | 4/2020 | Alperovich et al. | |

FOREIGN PATENT DOCUMENTS

| | | |
|---|---|---|
| CN | 106383738 A | 2/2017 |
| CN | 108390771 A | 8/2018 |
| CN | 109254842 A | 1/2019 |
| CN | 110262995 A | 9/2019 |
| EP | 3 474 139 A1 | 4/2019 |
| WO | WO 2018/058707 A1 | 4/2018 |
| WO | WO 2020/068209 A1 | 4/2020 |

OTHER PUBLICATIONS

International Search Report for PCT/CN2021/080889 mailed on Jun. 21, 2021.
European Search Report For EP 21793522.0 issued on Feb. 16, 2024 from European patent office in a counterpart European patent application.

* cited by examiner

METHOD AND DEVICE FOR CONSTRUCTING COMMUNICATION TOPOLOGY STRUCTURE ON BASIS OF MULTIPLE PROCESSING NODES

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/CN2021/080889, filed Mar. 15, 2021, which claims priority to the benefit of Chinese Patent Application No. 202010334771.X filed in the Chinese Intellectual Property Office on Apr. 24, 2020, the entire contents of which are incorporated herein by reference.

BACKGROUND

1. TECHNICAL FIELD

The present disclosure relates to the field of artificial intelligence. More specifically, the present disclosure relates to the field of inter-chip communication of a plurality of processors.

2. BACKGROUND ART

During neural network training, if consuming time for training a neural network with a size of X by a single machine is T, when there are N identical machines to train the neural network, in an ideal state, training time should be T/N, which is also known as ideal linear speedup. However, the ideal linear speedup is unpractical because of communication overheads. Although a computing part may be accelerated linearly, a communication part (such as an AllReduce algorithm) is objective and may not be eliminated.

In order to approach the ideal linear speedup, there are many methods. One method is to optimize communication time, such as shortening the communication time; another method is to overlap operations, such as masking the communication time in computing time (such as communication convergence and asynchronous update, and the like).

There are many methods to optimize the communication time, such as adopting high-speed communication technologies and adopting an optimized communication algorithm.

During a neural network training process of multiple machines and multiple board cards, in order to ensure convergence of data parallel training results of the multiple machines and the multiple board cards, each node involved in distributed training is required to send gradient information $\Delta W_i$ for back propagation (BP) by a current node to other nodes, so as to finally enable each node to obtain all gradient information, which is $\Sigma \Delta W_i$. A method for propagating and accumulating the gradient information is called the AllReduce algorithm.

The AllReduce algorithm may be implemented in different network topology structures, where an AllReduce algorithm optimally implemented in a ring topology (Ring) adopts a Ring AllReduce algorithm.

From the perspective of a single board card, a core process that is required to be implemented by the AllReduce includes: Receive (R for short), Compute (C for short), and Send (S for short). In the Ring AllReduce algorithm, R corresponds to receiving gradient information $\Delta W_{i-1}$ from an upstream node, C corresponds to computing $\Delta W_i = \text{Add}(\Delta W_{i-1}, \Delta W_i)$, and S corresponds to sending gradient information $\Delta W_i$ downstream.

However, existing technologies may not fully support an R-C-S process on a processing device side, or even if the processing device side may fully support the R-C-S process, some problems, such as a waste of computing resources or an increase of chip area and power consumption caused by thread management, may be brought.

Additionally, in the existing technologies, communication between processing nodes requires participation and management of a host, resulting in frequent communication between the host and the processing nodes, thus reducing communication efficiency and computation efficiency. Therefore, a problem that is to be addressed by the present disclosure is how to fully support the R-C-S process on the processing device side without introducing chip thread management capabilities while efficiently utilizing computing resources.

SUMMARY

The purpose of the present disclosure is to solve the shortcomings of unreasonable occupation and waste of computing resources in the existing technologies.

A first aspect of the present disclosure provides a method for constructing a communication topology structure based on a plurality of processing nodes. The method includes: constructing node configuration information, where the node configuration information includes upstream node information, current node information, and downstream node information; and sending the node configuration information to at least two processing nodes to construct the communication topology structure.

A second aspect of the present disclosure provides a device for constructing a communication topology structure based on a plurality of processing nodes. The device includes: a first apparatus configured to construct node configuration information, where the node configuration information includes upstream node information, current node information, and downstream node information; and a second apparatus configured to send the node configuration information to at least two processing nodes to construct the communication topology structure.

A third aspect of the present disclosure provides a system for constructing a communication topology structure based on a plurality of processing nodes. The system includes: a plurality of processing nodes; and a host, which includes a constructing unit. The constructing unit includes: a first apparatus configured to construct node configuration information, where the node configuration information includes upstream node information, current node information, and downstream node information; and a second apparatus configured to send the node configuration information to at least two processing nodes to construct the communication topology structure.

A fourth aspect of the present disclosure provides an electronic device. The electronic device includes: one or a plurality of processors; and a memory, on which a computer-executable instruction is stored, where, when the computer-executable instruction is executed by the one or the plurality of processors, the electronic device performs the above-mentioned method.

A fifth aspect of the present disclosure provides a computer-readable storage medium, including a computer-executable instruction. When the computer-executable instruction is executed by one or a plurality of processors, the above-mentioned method is performed.

The beneficial effects provided by the technical solution of the present disclosure at least include the followings.

The method of pre-applying resources of the present disclosure solves consistent occupation of multi-node resources in a distributed scenario and relieves resource deadlocks caused by insufficient resource application of some nodes of the processing device. Additionally, the method solves automatic routing of data receiving, computing, and sending of the processing device without requiring a host to actively intervene an execution process of the processing device. Further, the method is user-friendly without requiring a user to understand an underlying hardware structure, a descriptor, or a complex configuration process of a template, thus reducing development complexity of a distributed task (such as AllReduce).

BRIEF DESCRIPTION OF THE DRAWINGS

By reading the following detailed description with reference to drawings, the above-mentioned and other objects, features and technical effects of exemplary implementations of the present disclosure will become easier to understand. In the drawings, several implementations of the present disclosure are shown in an exemplary but not restrictive manner, and the same or corresponding reference numerals indicate the same or corresponding parts.

FIGS. 5A-5C are schematic diagrams of setting a plurality of pieces of node configuration information for a single node according to an implementation of the present disclosure.

DETAILED DESCRIPTION

A technical solution in embodiments of the present disclosure will be described clearly and completely hereinafter with reference to drawings in the embodiments of the present disclosure. Obviously, embodiments to be described are merely some rather than all embodiments of the present disclosure. All other embodiments obtained by those skilled in the art based on the embodiments of the present disclosure without creative efforts shall fall within the scope of protection of the present disclosure.

It should be understood that terms such as "first", "second", "third", and "fourth" that appear in the claims, the specification, and the drawings are used for distinguishing different objects rather than describing a specific order. It should be understood that terms "including" and "comprising" used in the specification and the claims indicate the presence of a feature, an entity, a step, an operation, an element, and/or a component, but do not exclude the existence or addition of one or more of other features, entities, steps, operations, elements, components, and/or collections thereof.

It should also be understood that terms used in the specification of the present disclosure are merely intended to describe a specific embodiment rather than to limit the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims refers to any and all possible combinations of one or more of relevant listed items and includes these combinations.

As being used in the specification and the claims, a term "if" may be interpreted as "when", or "once" or "in response to a determination" or "in response to a case where something is detected" depending on the context. Similarly, depending on the context, a clause "if it is determined that" or "if [a described condition or event] is detected" may be interpreted as "once it is determined that", or "in response to a determination", or "once [a described condition or event] is detected", or "in response to a case where [a described condition or event] is detected".

In the present disclosure, a processing device may be any apparatus, module, device, and unit that may receive, compute, and send data, such as a processor, a chip, and a circuit, and the like.

Figure 1:
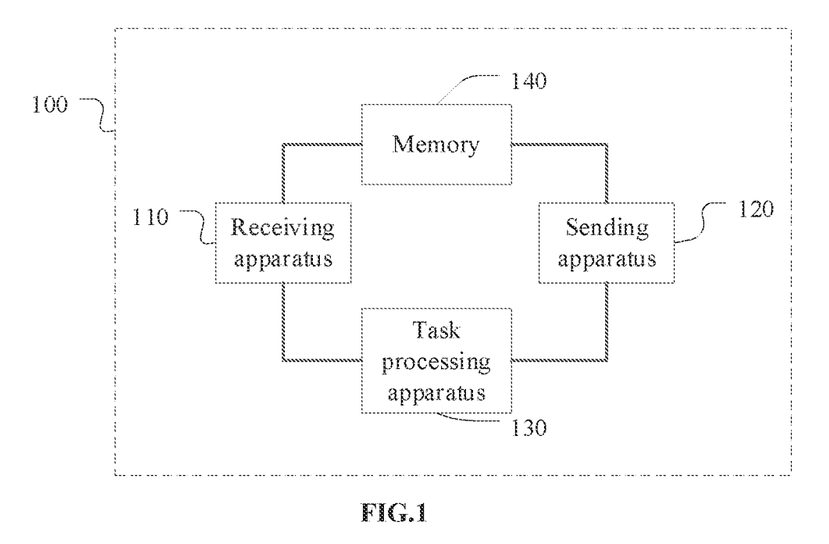
FIG. 1 is a schematic structural diagram of a processing node according to an implementation of the present disclosure.

FIG. 1 is a schematic structural diagram of a processing node according to an implementation of the present disclosure.

The processing node may be, may include, or may be included in the aforementioned processing device. The processing node may include a communication apparatus 100, including a receiving apparatus 110, a task processing apparatus 130, a sending apparatus 120, and a memory 140. One side of the task processing apparatus 130 is connected to the receiving apparatus 110, and another side of the task processing apparatus 130 is connected to the sending apparatus 120. The receiving apparatus 110 and the sending apparatus 120 are connected to the memory 140, respectively.

The receiving apparatus 110 may receive data from other processing nodes or an upper driver and send the data received to the task processing apparatus 130 for computing to obtain to-be-sent data. The memory 140 may be used to store various types of data received by the communication apparatus and during a computing process. The sending apparatus 130 may be used to send the data out.

It is required to be understood that the explanation of each processing node above is only for the sake of understanding. In the technical solution of the present disclosure, a user may not be required to understand an underlying hardware structure and a parsing process of an underlying signal.

Figure 2:
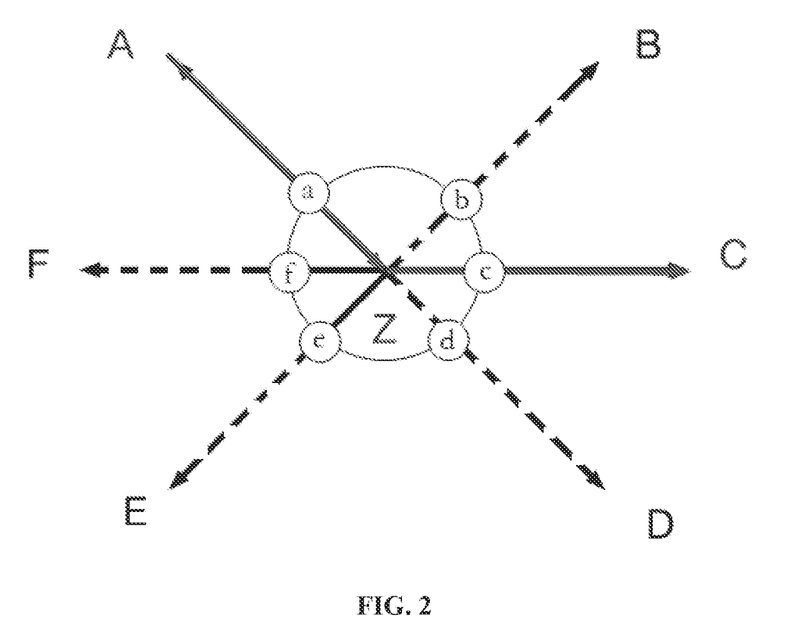
FIG. 2 is a schematic diagram of a connection between one processing node and other processing nodes according to an implementation of the present disclosure.

FIG. 2 is a schematic diagram of a connection between one processing node and other processing nodes according to an implementation of the present disclosure.

In FIG. 2, Z may be regarded as a processing node, the processing node may have a plurality of ports, such as ports a-f, and the processing node Z may be connected to other processing nodes A-F through these ports. Connections between the processing node Z and other processing nodes A-F may be enabled or disabled, thus forming different topology structures. For example, FIG. 2 shows that both a connection between the processing node Z and a processing node A and a connection between the processing node Z and a processing node C are enabled (which are represented by solid lines). However, although there are physical connections between the processing node Z and other processing nodes B, D, E, and F, there is no actual communication (which is represented by dashed lines), thereby forming a topology structure (A, Z, C). It may be understood that the processing node Z may further form any other type of topology structure, such as (F, Z, B), (E, Z, A), and (A, Z, (B, C)). The (A, Z, (B, C)) shows that a connection between the processing node Z and the processing node A is enabled, and both a connection between the processing node Z and the processing node B and a connection between the processing node Z and the processing node C are enabled.

It may be shown from the above that, by changing enabling relationships of connections between each processing node and other processing nodes, required topology structures may be formed conveniently.

Figure 3:
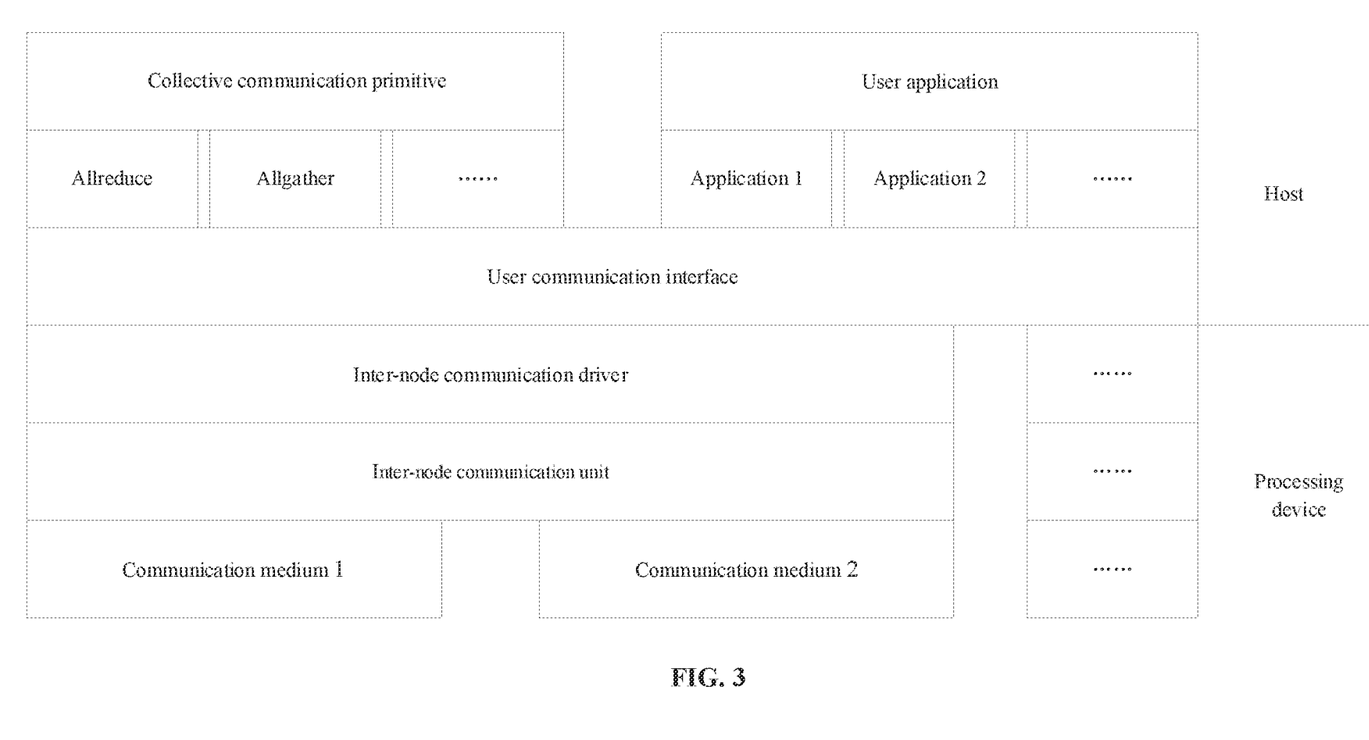
FIG. 3 is an environment diagram of a system applicable according to a method of the present disclosure.

FIG. 3 is an environment diagram of a system applicable according to a method of the present disclosure.

As shown in FIG. 3, the system may include a host and a processing device. The processing device may be equal to, may include, or may be included in a processing node. As such, the processing device and the processing node may be used interchangeably in the present disclosure. It is required to be understood that the processing device may be combined with the host to form one system, or the processing device may be an independent system. A user may edit in the host to manage the processing device. The host may be implemented by adopting a general-purpose computer or a special-purpose computer and may include collective communication primitives, such as AllReduce and Allgather mentioned above, a plurality of types of user applications, and an inter-node communication driver. The processing device may include an inter-node communication unit, and a plurality of types of communication media and corresponding ports, such as RoCE and Interlaken, under the inter-node communication unit.

The host may further include a user communication interface of the present disclosure. The user communication interface may be used to manage communication between processing nodes without modifying a driver program every time. The user is not required to understand an underlying hardware structure and a parsing process of an underlying signal.

Figure 4A:
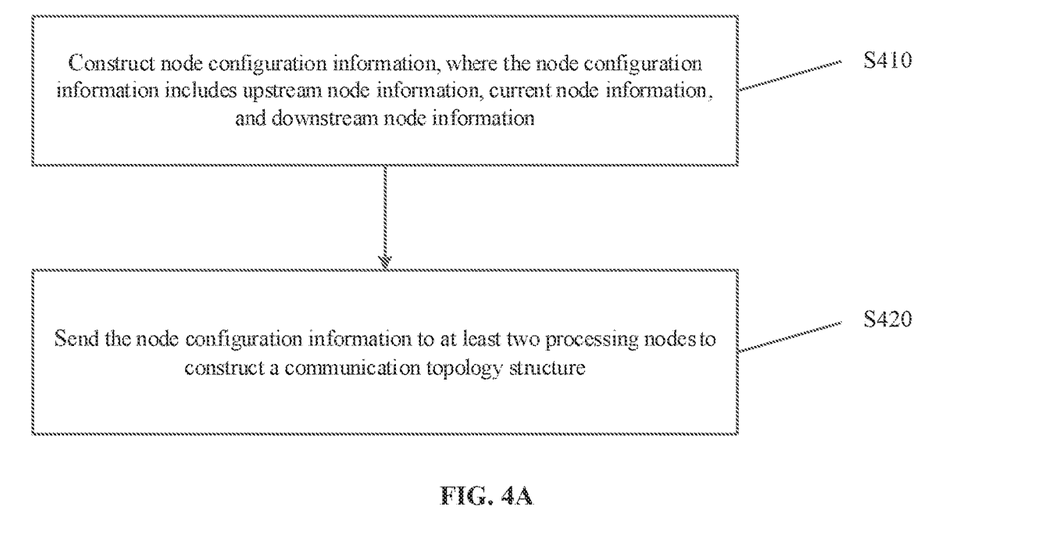
FIG. 4A is a flowchart of a method for constructing a communication topology structure based on a plurality of processing nodes according to an implementation of the present disclosure.
Figure 4B:
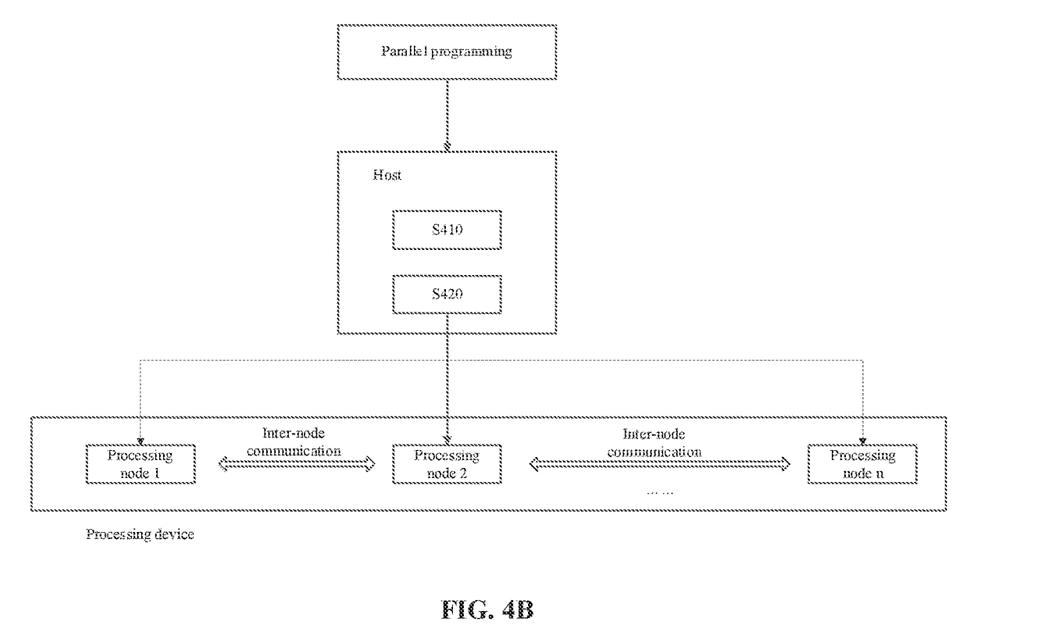
FIG. 4B is a schematic diagram of a multi-processing-node system for constructing a communication topology structure based on a plurality of processing nodes according to an implementation of the present disclosure.

FIG. 4A is a flowchart of a method for constructing a communication topology structure based on a plurality of processing nodes according to an implementation of the present disclosure. FIG. 4B is a schematic diagram of a multi-processing-node system for constructing a communication topology structure based on a plurality of processing nodes according to an implementation of the present disclosure.

As shown in FIG. 4A, the method may include: in an operation S410, constructing node configuration information, where the node configuration information includes upstream node information, current node information, and downstream node information; and in an operation S420, sending the node configuration information to at least two processing nodes to construct the communication topology structure.

First, the node configuration information may be constructed in a host. The node configuration information may indicate how processing nodes or connections between each processing node and other processing nodes will be configured. Constructing the node configuration information in the host may be implemented through parallel programming.

According to an implementation of the present disclosure, here, "other processing nodes" may be processing nodes having connections with the processing node. Assuming that a certain processing node is called a current node, a processing node that sends data or information to the current node is called an upstream node of the current node, and a processing node that receives the data or information from the current node is called a downstream node of the current node. Therefore, the node configuration information including the upstream node information, the current node information, and the downstream node information may be used to describe a certain node and other nodes adjacent to the node completely.

In a case that there are two processing nodes, such as a processing node A and a processing node B, and the processing node A sends data to the processing node B and the data is processed in the processing node B, the processing node B is the current node, the processing node A is an upstream node of the processing node B, and there is no downstream node of the processing node B.

It may be understood that, in the case of two processing nodes including the processing node A and the processing node B above, if the processing node A is the current node, the processing node B is the downstream node of the processing node A, and there is no upstream node of the processing node A.

Additionally, it is required to be understood that "sending the node configuration information to at least two processing nodes" does not necessarily mean sending the node configuration information to the processing nodes directly, but for example, sending the node configuration information to a driver and then sending the node configuration information to the processing nodes directly or indirectly by the driver. Any direct or indirect method capable of sending the node configuration information to the processing nodes shall fall within the scope of protection of the present disclosure.

After the node configuration information is constructed, as shown in both FIG. 4A and FIG. 4B, the node configuration information may be sent to at least two processing nodes, thus forming different topology networks through the plurality of processing nodes. In FIG. 4B, the constructed node configuration information may be sent to a processing node 1, a processing node 2, . . . , and a processing node n, and the like. After receiving the node configuration information, the processing nodes may form different topology networks, and based on these topology networks, the processing nodes may perform communication and process data.

In the solution above, as long as running rules of the processing nodes of each device are set in the host, the host may be no longer involved in communication and data processing between the processing nodes, thus decreasing interactions between the host and the device and improving running efficiency.

It is required to be understood that FIG. 4B is only an example of the host and the processing device, both of which are not necessarily as shown in FIG. 4B. For example, the plurality of processing nodes may be in either one processing device or a plurality of processing devices and may be controlled by one or a plurality of hosts. Each host may control one or a plurality of processing nodes. The control of the processing node(s) by the host may be in either a serial manner or a parallel manner. For example, the host may configure each processing node one by one, or the host may configure the plurality of processing nodes simultaneously. Any combination method of the host and the processing node(s) shall fall within the scope of protection of the present disclosure.

According to an implementation of the present disclosure, the upstream node information may be used to indicate a processing node sending data to the current node, the current node information may be used to indicate a processing node computing the data received, and the downstream node information may be used to indicate a processing node receiving the data computed from the current node.

Taking three interconnected processing nodes A, B, and C as examples, the processing node A is an upstream node of the processing node B and sends data to the processing node B; the processing node B performs a computing function and performs computing and processing after receiving the data from the processing node A; and the processing node C is a downstream node of the processing node B and sends the data processed to the processing node C after the processing node B processes the data. Therefore, the node configuration information may be sent to the processing node B, and after receiving the node configuration information, the processing node B may parse the node configuration information. As such, it is known that the upstream node that sends the data to the processing node B is the processing node A, and after computing and processing the data received, the processing node B shall send these pieces of data to the downstream processing node C. By sending such node configuration information to each processing node, the processing node that has received the node configuration information may know a role it plays and detailed information about the upstream node and the downstream node. Therefore, by modifying content of the node configuration information, different topology networks may be arranged and designed, efficiency of setting the topology networks may be improved, and difficulty of setting the topology networks may be reduced.

There are many forms of node configuration information. According to an implementation of the present disclosure, the node configuration information may be in the form of a queue tuple <upstream node, current node, downstream node>. As described above, when the node configuration information is sent to each processing node, information included in the tuple may enable the processing node that has received the node configuration information to know the role it plays and the detailed information of the upstream node and the downstream node.

According to another implementation of the present disclosure, the node configuration information may be in the form of a queue tuple <upstream node, downstream node>. In this implementation, an element "current node" is omitted since the current node may be set as a default, which means that, no matter which processing node the node configuration information is sent to, the processing node that has received the node configuration information is the current node by default.

According to an implementation of the present disclosure, node configuration information for a single processing node has a plurality of pieces of node configuration information, and the node configuration information has a plurality of pieces of different upstream node information and/or a plurality of pieces of different downstream node information.

Figure 5A:
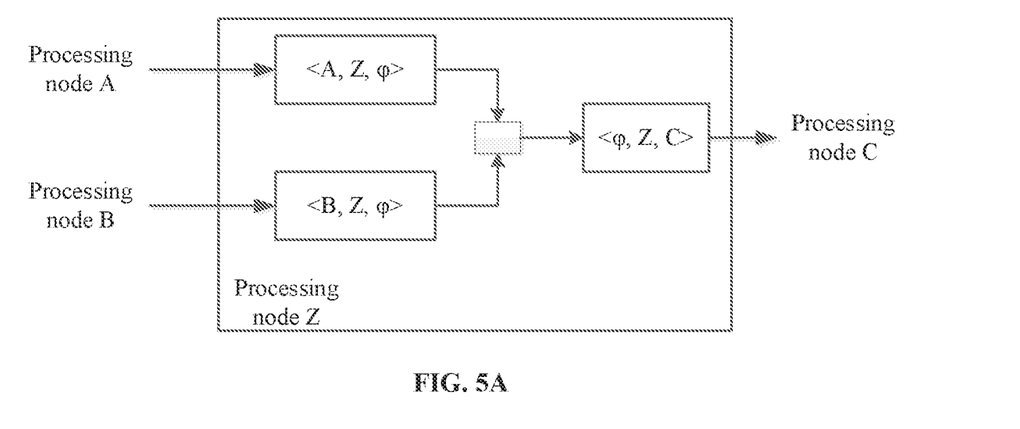
FIG. 5A shows that the single node has a plurality of inputs.
Figure 5B:
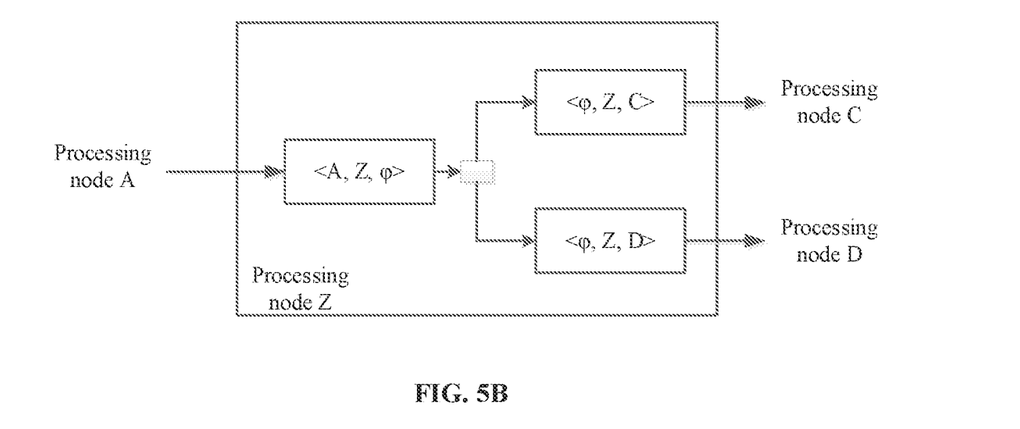
FIG. 5B shows that the single node has a plurality of outputs.
Figure 5C:
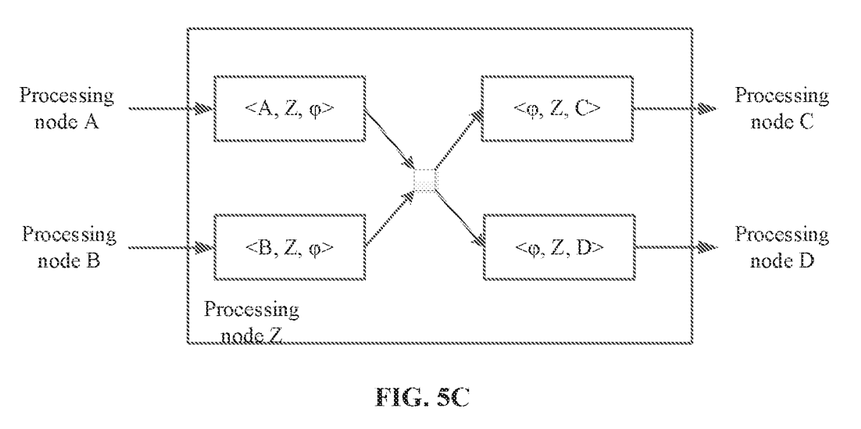
FIG. 5C shows that the single node has the plurality of inputs and the plurality of outputs.

FIGS. 5A-5C are schematic diagrams of setting a plurality of pieces of node configuration information for a single node according to an implementation of the present disclosure. FIG. 5A shows that the single node has a plurality of inputs; FIG. 5B shows that the single node has a plurality of outputs; and FIG. 5C shows that the single node has the plurality of inputs and the plurality of outputs.

As shown in FIG. 5A, a node Z is a current node and includes two upstream nodes A and B and one downstream node C. As such, in order to implement such configuration, node configuration information that is sent to the processing node Z may include: <A, Z, φ>, <B, Z, φ>, and <( , Z, C>, where φ represents a null. In this implementation, the processing node Z may receive data from both the processing node A and the processing node B, and after computing and processing the data, the processing node Z may send the data processed to the processing node C. Additionally, FIG. 5A illustratively represents a task processing part for processing and computing data that is from the processing node A and the processing node B through a box. The task processing part may correspond to the task processing apparatus shown in FIG. 1, which will not be repeated in the following.

As shown in FIG. 5B, a node Z is a current node and includes one upstream node A and two downstream nodes C and D. As such, in order to implement such configuration, node configuration information that is sent to the processing node Z may include: <A, Z, φ>, <φ, Z, C>, and <φ, Z, D>, where φ represents a null. In this implementation, the processing node Z may receive data from the processing node A, and after computing and processing the data, the processing node Z may send the data processed to both the processing node C and the processing node D.

As shown in FIG. 5C, a node Z is a current node and includes two upstream nodes A and B and two downstream nodes C and D. As such, in order to implement such configuration, node configuration information that is sent to the processing node Z may include: <A, Z, φ>, <B, Z, φ>, <φ, Z, C>, and <φ, Z, D>, where φ represents a null. In this implementation, the processing node Z may receive data from both the processing node A and the processing node B, and after computing and processing the data, the processing node Z may send the data processed to both the processing node C and the processing node D.

It is required to be understood that the above illustrates two upstream nodes and two downstream nodes, however, as long as the number of ports allows, those skilled in the art may expand the upstream nodes and the downstream nodes to any number of nodes. Additionally, the form of a tuple may only include the upstream node and the downstream node without the current node.

Additionally, in the above, although φ represents the null, φ plays a bridging role as the same node. For example, <B, Z, φ> and <φ, Z, C> may represent that the processing node Z is a bridging node between the processing node B and the processing node C.

According to an implementation of the present disclosure, one of the upstream node information and the downstream node information may be null.

In addition to the above case where the upstream node or the downstream node is null, there are other cases. For example, when a certain processing node is an endpoint of the topology structure, the upstream node information or the downstream node information may be null, which will be described in detail hereinafter.

According to an implementation of the present disclosure, sending the node configuration information to at least two processing nodes to construct the communication topology structure includes: sending different node configuration information to at least part of processing nodes of all processing nodes to construct the at least part of processing nodes as different communication topology structures.

It may be shown from the description above that, by sending different node configuration information to each processing node, processing nodes that have received the node configuration information may form different connections. As such, by sending the node configuration information to the plurality of processing nodes, more complex and various topology structures may be formed.

Figure 6A:
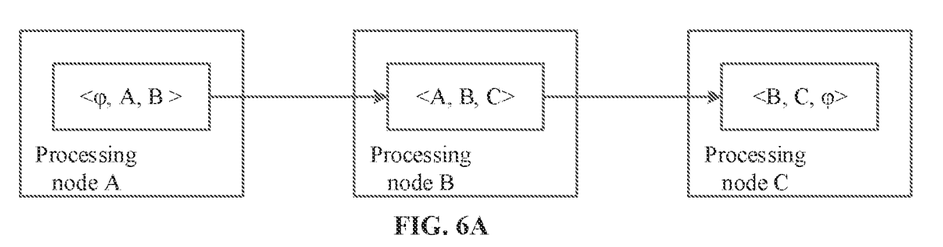
FIGS. 6A-6C illustratively show schematic diagrams of a chain topology structure, a ring topology structure, and a tree topology structure, respectively.
Figure 6B:
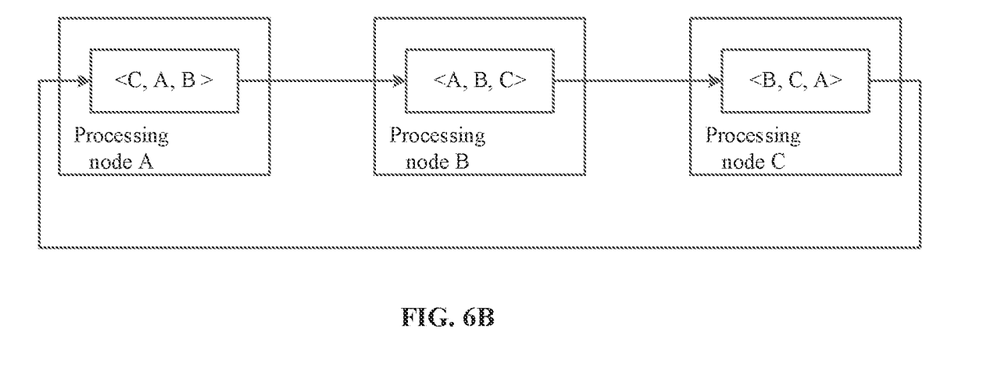
Figure 6C:
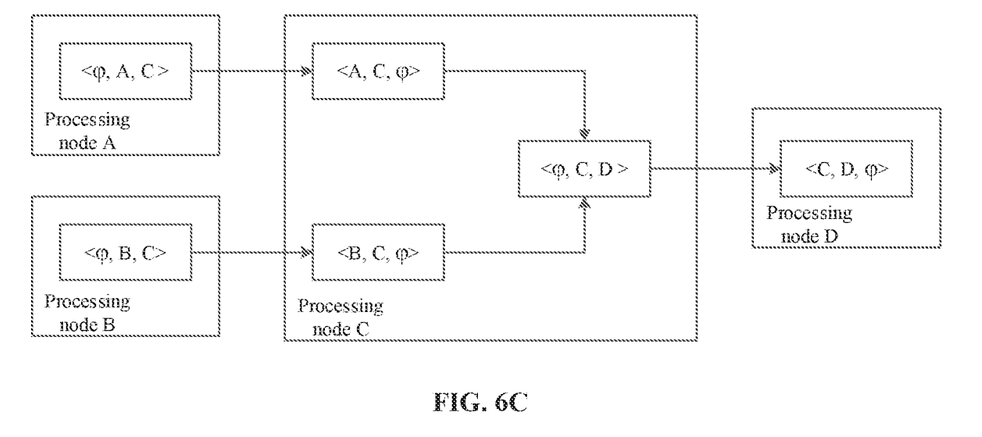

FIGS. 6A-6C illustratively show schematic diagrams of a chain topology structure, a ring topology structure, and a tree topology structure, respectively.

As shown in FIG. 6A, a processing node A, a processing node B, and a processing node C constitute a chain topology structure. These three processing nodes A, B, and C are connected serially in turn, where, when the processing node A is an endpoint, node configuration information of the processing node A is <φ, A, B>, which means that the processing node A is a current node, an upstream node of the processing node A is a null, and a downstream node of the processing node A is the processing node B. Similarly, for the processing node B, node configuration information of the processing node B is <A, B, C>, which means that the processing node B is the current node, an upstream node of the processing node B is the processing node A, and a downstream node of the processing node B is the processing node C. Similarly, for the processing node C, node configuration information of the processing node C is <B, C, φ>, which means that the processing node C is the current node, an upstream node of the processing node C is the processing node B, and a downstream node of the processing node C is the null.

As shown in FIG. 6B, a processing node A, a processing node B, and a processing node C constitute a ring topology structure. These three processing nodes A, B, and C are connected serially in turn, and the processing node A and the processing node C are connected, thereby forming a ring structure. For the processing node A, node configuration information of the processing node A is <C, A, B>, which means that the processing node A is a current node, an upstream node of the processing node A is the processing node C, and a downstream node of the processing node A is the processing node B. Similarly, for the processing node B, node configuration information of the processing node B is <A, B, C>, which means that the processing node B is the current node, an upstream node of the processing node B is the processing node A, and a downstream node of the processing node B is the processing node C. Similarly, for the processing node C, node configuration information of the processing node C is <B, C, A>, which means that the processing node C is the current node, an upstream node of the processing node C is the processing node B, and a downstream node of the processing node C is the processing node A.

As shown in FIG. 6C, a processing node A, a processing node B, a processing node C, and a processing node D constitute a tree topology structure. The processing nodes A and the processing node B are connected to the processing node C, respectively, and the processing node C is connected to the processing node D. For the processing node A, node configuration information of the processing node A is <φ, A, C>, which means that the processing node A is a current node, an upstream node of the processing node A is a null, and a downstream node of the processing node A is the processing node C. Similarly, for the processing node B, node configuration information of the processing node B is <φ, B, C>, which means that the processing node B is the current node, an upstream node of the processing node B is the null, and a downstream node of the processing node B is the processing node C.

For the processing node C, since the processing node C has two inputs and one output, there are three groups of node configuration information, which are <A, C, φ>, <B, C, φ>, and <φ, C, D >, respectively. The <A, C, φ>means that the current node is C, and an upstream node of C is A. The <B, C, φ>means that the current node is C, and the upstream node of C is B. The <φ, C, D > means that the current node is C, and a downstream node of C is D.

For the processing node D, node configuration information of the processing node D is <C, D, φ>, which means that the current node is D, an upstream node of D is the processing node C, and a downstream node of D is the null.

It is required to be understood that FIGS. 6A-6C above are just a few examples of a plurality of types of topology structures, and those skilled in the art may construct various types of required topology structures by modifying the node configuration information and sending the node configuration information to different nodes. Additionally, for the sake of conciseness, FIG. 6A-6C omit the task processing part in FIG. 5A-5C.

Such configuration facilitates a user to construct different topology structures through a simple manner, thus simplifying operations and improving efficiency.

According to an implementation of the present disclosure, constructing the communication topology structure may include enabling the processing nodes in the communication topology structure to reserve resources.

After the communication topology structure is constructed according to the above manner, resources may be reserved for all processing nodes in the constructed topology structure, such as communication resources and/or register resources. These resources may be used for subsequent communication, storage and computing of the processing nodes. In this way, the processing nodes are not required to apply for resources temporarily during processing, thus making subsequent processing more efficient.

The communication resources above may include: a port and/or a channel required for inter-node communication. The communication port is a network medium port module wired physically between two processing nodes. The communication channel is a virtual communication link between a sending apparatus and a receiving apparatus that are matched by two processing nodes. Generally speaking, which direct memory access (DMA) sending module and which DMA receiving module are selected from a large set of DMAs.

The register resources may include storage space used for storing task description information. The task description information is used to indicate an operation to be performed by each processing node in the communication topology structure constructed. The task description information, for example, may specify what operation (such as sending, computing, and receiving) each processing node should perform, how each processing node performs the operation, and when each processing node performs the operation.

Figure 7:
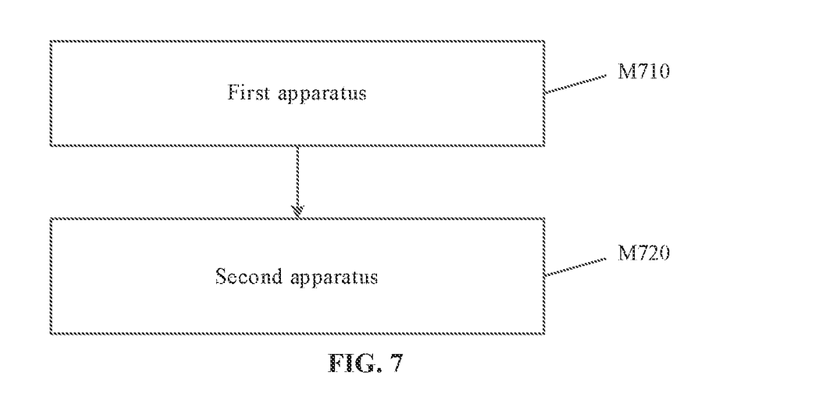
FIG. 7 shows a device for constructing a communication topology structure based on a plurality of processing nodes according to an implementation of the present disclosure.

FIG. 7 shows a device for constructing a communication topology structure based on a plurality of processing nodes according to an implementation of the present disclosure. The device includes: a first apparatus M710 configured to construct node configuration information, where the node configuration information includes upstream node information, current node information, and downstream node information; and a second apparatus M720 configured to send the node configuration information to at least two processing nodes to construct the communication topology structure.

The device above may be implemented through software, hardware, or firmware, so as to realize functions shown in FIG. 4. The device may be set or integrated in any other device, such as a host or a server.

Therefore, the present disclosure further provides a system for constructing a communication topology structure based on a plurality of processing nodes. The system includes: a plurality of processing nodes; and a host, which includes a constructing unit. The constructing unit includes: a first apparatus M710 configured to construct node configuration information, where the node configuration information includes upstream node information, current node information, and downstream node information; and a second apparatus M720 configured to send the node configuration information to at least two processing nodes to construct the communication topology structure.

Another aspect of the present disclosure further provides an electronic device. The electronic device includes: one or a plurality of processors; and a memory, on which a computer-executable instruction is stored, where, when the computer-executable instruction is executed by the one or the plurality of processors, the electronic device performs the above-mentioned method.

Another aspect of the present disclosure further provides a computer-readable storage medium, including a computer-executable instruction. When the computer-executable instruction is executed by one or a plurality of processors, the above-mentioned method is performed.

The method of pre-applying resources of the present disclosure solves consistent occupation of multi-node resources in a distributed scenario and relieves resource deadlocks caused by insufficient resource application of some nodes of the processing device. Additionally, the method solves automatic routing of data receiving, computing, and sending of the processing device without requiring the host to actively intervene an execution process of the processing device. Further, the method is user-friendly without requiring the user to understand an underlying hardware structure, a descriptor, or a complex configuration process of a template, thus reducing development complexity of a distributed task (such as AllReduce).

The technical solution of the present disclosure may be applied to an artificial intelligence field, may be implemented in the host and the server, or may be implemented as or may be implemented in an artificial intelligence chip. The chip may stand alone or may be included in a communication configuration apparatus.

Figure 8:
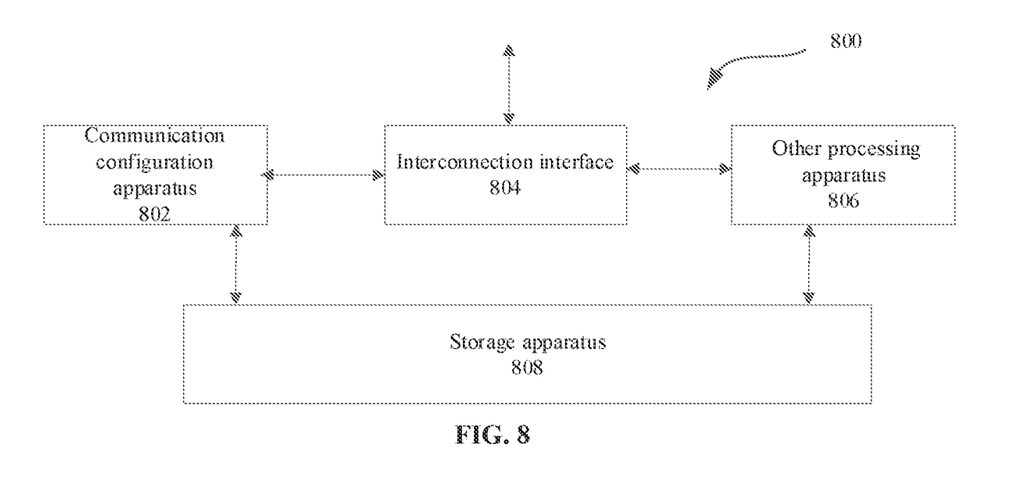
FIG. 8 is a schematic block diagram of a combined processing apparatus.

FIG. 8 shows a combined processing apparatus 800, including the above-mentioned communication configuration apparatus 802, an interconnection interface 804, and other processing apparatus 806. The communication configuration apparatus of the present disclosure interacts with other processing apparatus to jointly complete an operation specified by a user. FIG. 8 is a schematic diagram of the combined processing apparatus.

Other processing apparatus includes one or more types of general-purpose/special-purpose processors such as a central processing unit (CPU), a graphics processing unit (GPU), a neural network processor, and the like. The number of processors included in other processing apparatus is not limited herein. Other processing apparatus may serve as an interface that connects a machine learning computation apparatus to external data and controls, including data moving, and may complete basic controls, such as starting and stopping the machine learning computation apparatus. Other processing apparatus may also cooperate with the machine learning computation apparatus to complete a computation task.

The interconnection interface may be used to transfer data and a control instruction between the communication configuration apparatus (including, for example, the machine learning computation apparatus) and other processing apparatus. The communication configuration apparatus may obtain required input data from other processing apparatus and write the data in an on-chip storage apparatus of the communication configuration apparatus. The communication configuration apparatus may also obtain the control instruction from other processing apparatus and write the control instruction in an on-chip control caching unit of the communication configuration apparatus. Additionally, the communication configuration apparatus may further read data in a storage unit of the communication configuration apparatus and transfer the data to other processing apparatus.

Optionally, this structure may further include a storage apparatus 808. The storage apparatus may be connected to the communication configuration apparatus and other processing apparatus, respectively. The storage apparatus may be used to store data of the communication configuration apparatus and other processing apparatus. The storage apparatus may be especially suitable for storing data that may not be completely stored in an internal storage of the communication configuration apparatus or other processing apparatus of the present disclosure.

The combined processing apparatus may be used as a system on chip (SOC) of a device including a mobile phone, a robot, a drone, a video surveillance device, and the like, which may effectively decrease a core area of a control part, increase processing speed, and reduce overall power consumption. In this case, the interconnection interface of the combined processing apparatus may be connected to some components of the device. The some components include, for example, a webcam, a monitor, a mouse, a keyboard, a network card, and a WIFI interface.

Figure 9:
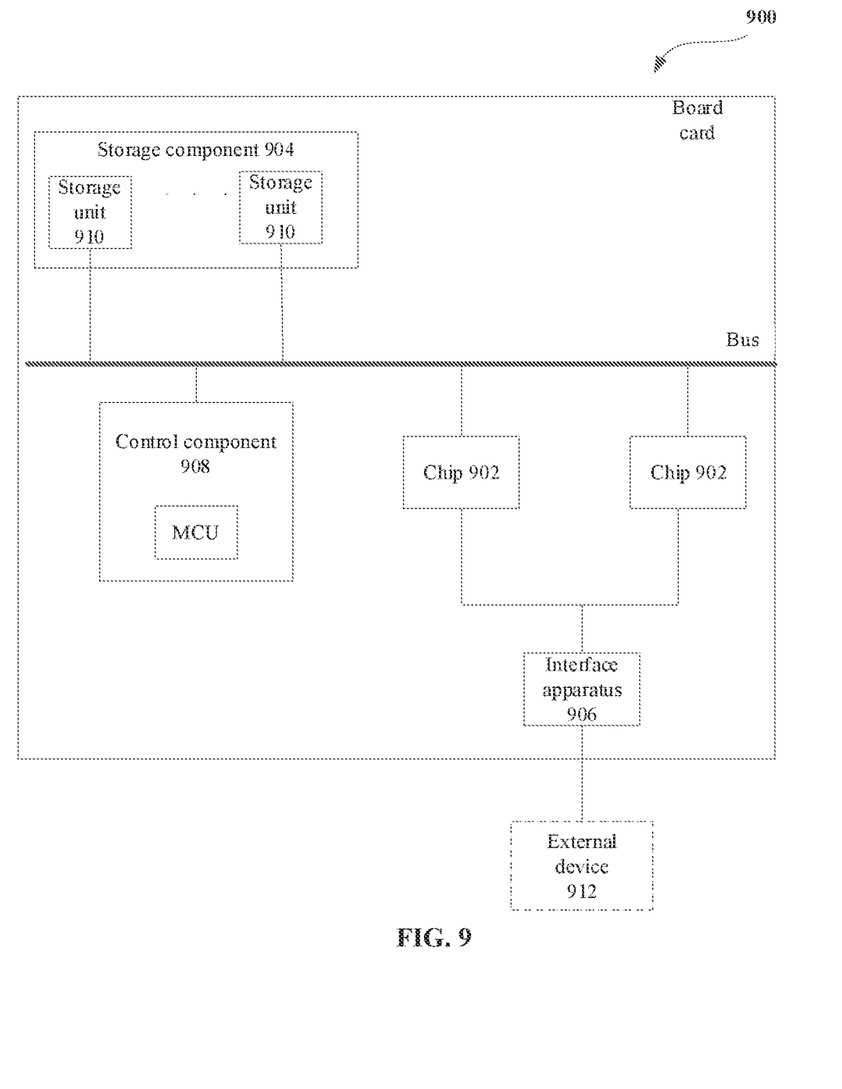
FIG. 9 is a schematic block diagram of a board card.

In some embodiments, the present disclosure further discloses a board card, including a chip package structure. Referring to FIG. 9, FIG. 9 shows an exemplary board card. The above-mentioned board card, other than the above-mentioned chip 902, may further include other supporting components. The supporting components include but are not limited to: a storage component 904, an interface apparatus 906, and a control component 908.

The storage component may be connected to the chip in the chip package structure through a bus. The storage component may be used for storing data. The storage component may include a plurality of groups of storage units 910. Each group of storage units may be connected to the chip through the bus. It may be understood that each group of storage units may be a double data rate (DDR) synchronous dynamic random access memory (SDRAM).

The DDR may double the speed of the SDRAM without increasing clock frequency. The DDR may allow data to be read on rising and falling edges of a clock pulse. The speed of the DDR is twice that of a standard SDRAM. In an embodiment, the storage component may include four groups of storage units. Each group of storage units may include a plurality of DDR4 particles (chips). In an embodiment, four 72-bit DDR4 controllers may be arranged inside the chip, where 64 bits of the 72-bit DDR4 controller above are used for data transfer, and 8 bits are used for error checking and correcting (ECC) parity. In an embodiment, each group of storage units may include a plurality of DDR SDRAMs arranged in parallel. The DDR may transfer data twice in one clock cycle. A controller for controlling the DDR may be arranged in the chip, and the controller may be used to control data transfer and data storage of each storage unit.

The interface apparatus may be electrically connected to the chip in the chip package structure. The interface apparatus may be used to implement data transfer between the chip and an external device 912 (such as a server or a computer). For example, in an embodiment, the interface apparatus may be a standard peripheral component interconnect express (PCIe). For instance, to-be-processed data may be transferred by the server through the standard PCIe to the chip, thereby realizing data transfer. In another embodiment, the interface apparatus may also be other interfaces. The present disclosure does not limit specific representations of other interfaces mentioned above, as long as an interface unit may realize a switching function. Additionally, a computing result of the chip is still sent back to the external device (such as the server) by the interface apparatus.

The control component may be electrically connected to the chip. The control component may be used to monitor a state of the chip. Specifically, the chip and the control component may be electrically connected through a serial peripheral interface (SPI). The control component may include a micro controller unit (MCU). If the chip may include a plurality of processing chips, a plurality of processing cores, or a plurality of processing circuits, the chip may be capable of driving a plurality of loads. Therefore, the chip may be in different working states, such as a multi-load state and a light-load state. Through the control component, regulation and controls of working states of the plurality of processing chips, the plurality of processing cores, and/or the plurality of processing circuits in the chip may be realized.

In some embodiments, the present disclosure further discloses an electronic device or apparatus, including the above-mentioned board card.

The electronic device or apparatus may include a data processing apparatus, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or a medical device.

The vehicle may include an airplane, a ship, and/or a car. The household appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

It is required to be explained that for the sake of conciseness, the foregoing method embodiments are all described as a series of combinations of actions, but those skilled in the art should know that the present disclosure is not limited by the described order of action since some steps may be performed in a different order or simultaneously according to the present disclosure. Secondly, those skilled in the art should also know that the embodiments described in the specification are all optional, and actions and modules involved are not necessarily required for the present disclosure.

In the embodiments above, the description of each embodiment has its own emphasis. For a part that is not described in detail in a certain embodiment, reference may be made to related descriptions in other embodiments.

In several embodiments provided in this disclosure, it should be understood that the disclosed apparatus may be implemented in other ways. For instance, the apparatus embodiments described above are merely exemplary. For instance, a division of units is only a logical function division. In an actual implementation, there may be other manners for the division. For instance, a plurality of units or components may be combined or integrated in another system, or some features may be ignored or may not be performed. In addition, the displayed or discussed mutual coupling or direct coupling or communication connection may be indirect coupling or communication connection using some interfaces, apparatuses, or units and may be in electrical, optical, acoustic, magnetic, or other forms.

The units described as separate components may or may not be physically separated. The components shown as units may or may not be physical units. In other words, the components may be located in one place, or may be distributed to a plurality of network units. According to actual requirements, some or all of the units may be selected for achieving purposes of the embodiments of the present disclosure.

Additionally, each functional unit in each embodiment of the present disclosure may be integrated in one processing unit, or each unit may exist separately and physically, or two or more units may be integrated in one unit. The integrated unit described above may be implemented either in the form of hardware or in the form of a software program unit.

If the integrated unit is implemented in the form of the software program unit and sold or used as an independent product, the integrated unit may be stored in a computer-readable memory. Based on such understanding, if the technical solution of the present disclosure is embodied in the form of a software product, the software product may be stored in a memory, and the software product may include several instructions used to enable a computer device (which may be a personal computer, a server, or a network device, and the like) to perform all or part of steps of the method of the embodiments of the present disclosure. The foregoing memory includes: a USB flash drive, a read-only memory (ROM), a random access memory (RAM), a mobile hard disk, a magnetic disk, or an optical disc, and other media that may store a program code.

The above has described the embodiments of the present disclosure in detail. The present disclosure uses specific examples to explain principles and implementations of the present disclosure. The descriptions of the embodiments above are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure.

The foregoing may be better understood according to the following articles:

Article 1. A method for constructing a communication topology structure based on a plurality of processing nodes, including:

constructing node configuration information, where the node configuration information includes upstream node information, current node information, and downstream node information; and sending the node configuration information to at least two processing nodes to construct the communication topology structure.

Article 2. The method of article 1, where the upstream node information is used to indicate a processing node that sends data to a current node, the current node information is used to indicate a processing node that computes the data received, and the downstream node information is used to indicate a processing node that receives the data computed from the current node.

Article 3. The method of article 1, where the node configuration information is in the form of a queue tuple, including <upstream node, downstream node> or <upstream node, current node, downstream node>.

Article 4. The method of article 1, where node configuration information for a single processing node has a plurality of pieces of node configuration information, and the node configuration information has a plurality of pieces of different upstream node information and/or a plurality of pieces of different downstream node information.

Article 5. The method of any one of articles 1-4, where one of the upstream node information and the downstream node information is null.

Article 6. The method of any one of articles 1-5, where sending the node configuration information to the at least two processing nodes to construct the communication topology structure includes: sending different node configuration information to at least part of processing nodes of all processing nodes to construct the at least part of processing nodes as different communication topology structures.

Article 7. The method of article 6, where the communication topology structure includes at least one of a chain topology structure, a ring topology structure, and a tree topology structure.

Article 8. The method of any one of articles 1-7, where constructing the communication topology structure includes enabling the processing nodes in the communication topology structure to reserve resources.

Article 9. The method of article 8, where the resources include communication resources and/or register resources.

Article 10. The method of article 9, where the communication resources include: a port and/or a channel required for inter-node communication; and the register resources include: storage space for storing task description information, where the task description information is used to indicate an operation to be performed by each processing node in the communication topology structure constructed.

Article 11. A device for constructing a communication topology structure based on a plurality of processing nodes, including:

a first apparatus configured to construct node configuration information, where the node configuration information includes upstream node information, current node information, and downstream node information; and a second apparatus configured to send the node configuration information to at least two processing nodes to construct the communication topology structure.

Article 12. A system for constructing a communication topology structure based on a plurality of processing nodes, including:

a plurality of processing nodes; and a host, which includes a constructing unit, where the constructing unit includes:

a first apparatus configured to construct node configuration information, where the node configuration information includes upstream node information, current node information, and downstream node information; and a second apparatus configured to send the node configuration information to at least two processing nodes to construct the communication topology structure.

Article 13. An electronic device, including:

one or a plurality of processors; and a memory, on which a computer-executable instruction is stored, where, when the computer-executable instruction is executed by the one or the plurality of processors, the electronic device performs the method of any one of articles 1-10.

Article 14. A computer-readable storage medium, including a computer-executable instruction, where, when the computer-executable instruction is executed by one or a plurality of processors, the method of any one of articles 1-10 is performed.

What is claimed is:

1. A method for constructing a communication topology structure based on a plurality of processing nodes, the method comprising:
constructing node configuration information, wherein the node configuration information comprises upstream node information, current node information, and downstream node information, wherein the node configuration information is constructed in a host; and
sending the node configuration information to at least two processing nodes to construct the communication topology structure, wherein the host is no longer involved in communication and data processing between the processing nodes,
wherein the upstream node information is used to indicate a processing node that sends data to a current node, the current node information is used to indicate a processing node that computes the data received, and the downstream node information is used to indicate a processing node that receives the data computed from the current node.

2. The method of claim 1, wherein the node configuration information is in the form of a queue tuple, comprising <upstream node, downstream node> or <upstream node, current node, downstream node>.

3. The method of claim 1, wherein node configuration information for a single processing node has a plurality of pieces of node configuration information, and the node configuration information has a plurality of pieces of different upstream node information and/or a plurality of pieces of different downstream node information.

4. The method of claim 1, wherein one of the upstream node information and the downstream node information is null.

5. The method of claim 1, wherein sending the node configuration information to the at least two processing nodes to construct the communication topology structure comprises:
sending different node configuration information to at least part of processing nodes of the plurality of processing nodes to construct the at least part of processing nodes as different communication topology structures.

6. The method of claim 5, wherein the communication topology structure comprises at least one of a chain topology structure, a ring topology structure, and a tree topology structure.

7. The method of claim 1, wherein constructing the communication topology structure comprises enabling the processing nodes in the communication topology structure to reserve resources.

8. The method of claim 7, wherein the resources comprise communication resources and/or register resources.

9. The method of claim 8, wherein the communication resources comprise: a port and/or a channel required for inter-node communication; and
   the register resources comprise: storage space for storing task description information, wherein the task description information is used to indicate an operation to be performed by each processing node in the communication topology structure constructed.

10. An electronic device, comprising:
    one or a plurality of processors; and
    a memory, on which a computer-executable instruction is stored, wherein, when the computer-executable instruction is executed by the one or the plurality of processors, the electronic device performs the method of claim 1.

11. A non-transitory computer-readable storage medium, comprising a computer-executable instruction, wherein, when the computer-executable instruction is executed by one or a plurality of processors, the method of claim 1 is performed.

* * * * *